Dec. 5, 1933.  W. E. SOMERS  1,937,724
AUTOMOBILE HEADLIGHT
Filed Feb. 28, 1931  2 Sheets-Sheet 1
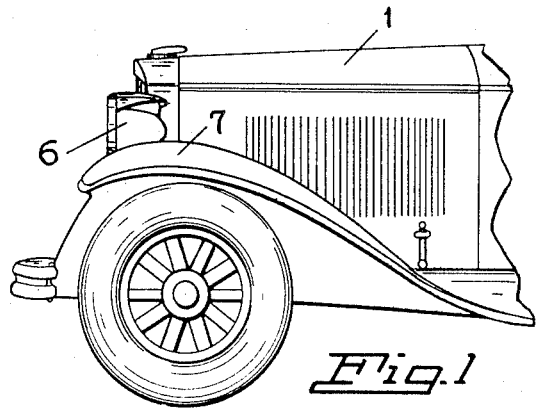
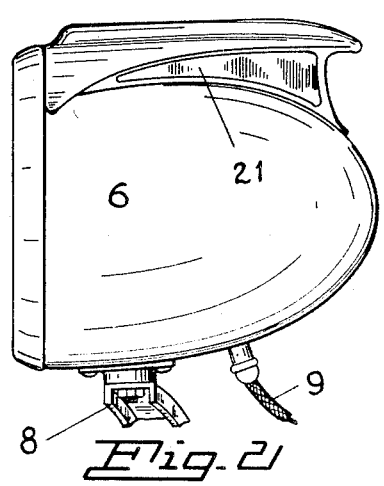
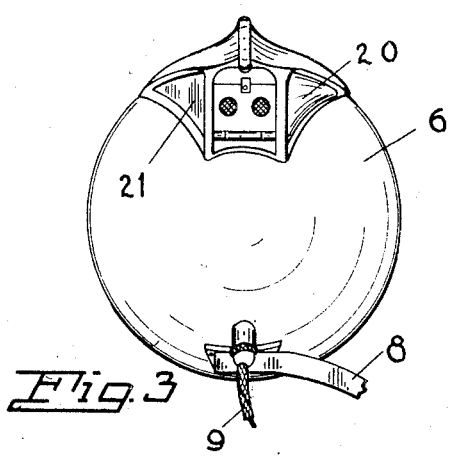
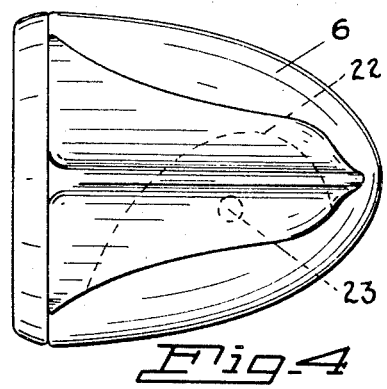
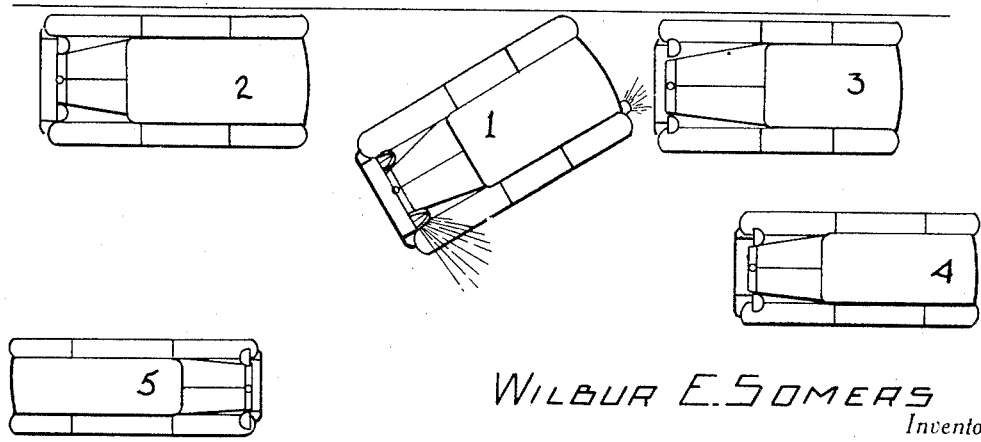
Wilbur E. Somers
Inventor
By Herbert E. Smith
Attorney Dec. 5, 1933.  W. E. SOMERS  1,937,724
AUTOMOBILE HEADLIGHT
Filed Feb. 28, 1931   2 Sheets-Sheet 2

WILBUR E. SOMERS
Inventor

By *Herbert E. Smith*
Attorney

Patented Dec. 5, 1933

1,937,724

UNITED STATES PATENT OFFICE 1,937,724

AUTOMOBILE HEADLIGHT

Wilbur E. Somers, Spokane, Wash.

Application February 28, 1931. Serial No. 519,180

3 Claims. (Cl. 177—329)

My present invention relates to improvements in automobile headlights whereby, in addition to the usual functions performed by such lights, a lateral signal lamp and a pair of indicator lenses are provided as important accessories for use at the front portion of the automobile. The lateral signal lamp is invisible from the front of the automobile, and also invisible from the rear of the automobile when the latter is traveling straight ahead, but the lateral signal lamp is readily visible to the driver of a following automobile when the first car turns out of the straight line, as from a lane of cars to pass a preceding car, or when the car turns from the right side of the road to make a left turn. In either contingency the lateral signal lamp, which may be red in color, immediately becomes visible to a driver following, and warns the driver of the second car to slow down or stop if necessary, to prevent colliding with the first car.

The indicator lenses are located at the rear of the headlight proper and are visible to the driver of the car as glowing indications that the headlight and the lateral signal lamp respectively are properly illuminated. Of course in the absence of the glow from an indicator lens the car driver is notified that the headlight, the lateral signal, or both, are not properly performing their functions.

The invention consists in certain novel combinations and arrangements of parts as will hereinafter be more fully set forth. In the accompanying drawings I have illustrated one complete example of the physical embodiment of my invention wherein the parts are combined and arranged according to one mode I have thus far devised for the practical application of the principles of my invention.

Figure 1 is a left side view at the left-front of the car showing the equipment of my invention.

Figure 2 is an enlarged side view of the headlight of my invention.

Figure 3 is a rear view of the headlight showing the two indicator lamps as well as the lateral signal lamp.

Figure 4 is a top plan view of the headlight.

Figure 5 is a diagrammatic view showing a car equipped with the headlight of my invention, turning from a line of cars, to the left, and exposing the lateral signal lamp to the driver of a following car.

Figure 6:
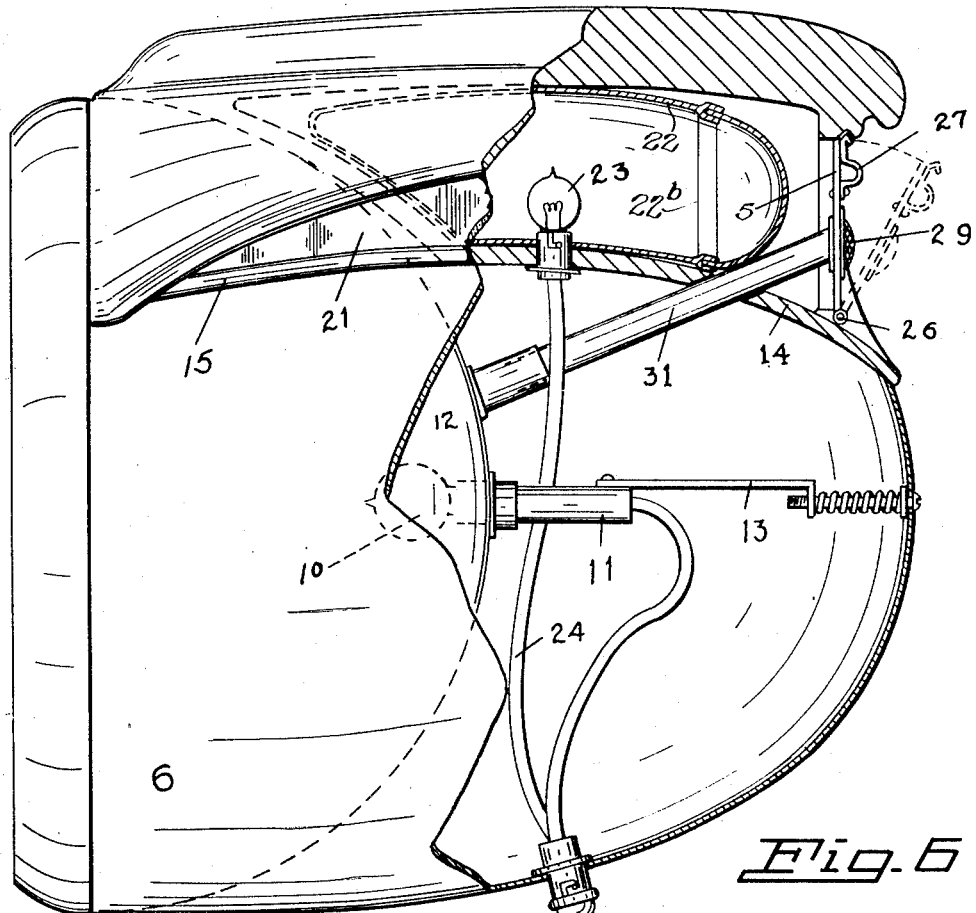
Figure 6 is an enlarged side view of the headlight, partly broken away, and disclosing the interior construction of the headlight.

In order to illustrate the utility of the device of my invention, attention is invited first to Figure 5 where the car 1 is turning toward the left from behind car designated 2 and in front of the following car designated 3. The car designated 4 is assumed to be attempting to pass cars indicated 3 and 1, and the car designated 5 is moving in direction opposite to the movement of the cars 1, 2, 3, and 4. The car designated 1 is provided with the headlight of my invention, designated as a whole by the numeral 6, and the lateral signal on the car 1 is being displayed to the driver of the car 4, to warn him of the dangerous conditions ahead and to give him the opportunity of slowing down or stopping to avoid collision with either car 1 or car 5.

The colored lateral signal is thus effective, especially at night, to prevent accidents, and to insure safety in traveling for motorists.

The headlight 6 is preferably carried adjacent to the left front wheel fender 7, and is supported on brackets as 8 that may be secured to a suitable support provided therefor. The usual wires 9 are provided for the lamp circuits, and they pass through a guide tube 11, through the wall of the reflector 12 to the usual illuminating lamp 10 shown by dotted lines in Figure 6.

The guide tube 11 for the wires forms part of an anti-rattling device 13, that extends from the rear of the reflector shell to the rear of the headlight casing 6, and this device braces the interior structure of the headlight.

The upper portion of the casing 6 has a partially open top, and the attachment comprising my invention closes this opening in the casing. The attachment includes a base plate 14 having exterior bottom flanges 15, which are riveted as at 16 to the casing 6 of the headlight, and the front portion of the attachment conforms to the front of the headlight casing 6. The top 17 slopes towards the sides from a longitudinally extending rib 18, and the lateral and rear edges of the top overhang or project beyond the body of the attachment as at 19. Between the base plate and the top of the attachment, the inner side wall 20 is closed, while the outer or left side of the attachment is provided with a window or lens 21 forming part of the lateral signal.

The attachment or superstructure of the headlight is hollow and within the interior of the superstructure a reflector 22 is mounted to reflect the rays from an electric lamp 23 that is mounted in the base plate 14 and has the usual wires 24 connected thereto.

In order that access to the interior of the reflector 22 may be had, the latter is provided with a removable rear-plate 22a that fits into the grooved rear edge 22b of the wall of the reflector, and this plate may be removed after the rear door 25 is opened.

The inner side wall 20, and especially the outer or lateral window or lens 21 of the auxiliary lamp or superstructure, are arranged on lines that converge toward the rear of the auxiliary lamp, and this position of the window 21 insures visibility of the lateral signal as soon as the car makes its initial turn to the left as in Figure 5, thus enabling the driver of the car 4 to see the signal lamp at the first turning movement of the car 1. The lens or window glass 21 may be red in color (or any other suitable color may be employed) to immediately attract the attention of the driver of the car 4.

The headlight, from its lamp 10 and reflector 12, of course directs its rays toward the roadway in the front of the car, while the colored signal lamp is only visible from the left side of the car 1, and of course is visible to a driver of a car that may be approaching at right angles from the left of the car equipped with the auxiliary signal lamp.

Inasmuch as the lateral signal lamp is not visible to the driver of the car so equipped, due to the location of the headlight and of the colored lens of the signal lamp, an indicator is provided for the auxiliary signal lamp as well as the headlight itself. At the rear end of the auxiliary lamp a door 25 is provided and disposed in a plane transverse to the longitudinal axis of the headlight, and this door is provided with a lower hinge 26 and an upper latch 27, to give ready access to the interior of the auxiliary lamp casing for replacements or repairs, as indicated by the dotted line position of the door in Figure 6.

In the door 25 are set two colored lenses (or plain glasses may be employed if desired) 28 for the lateral signal, and 29 for the headlight, and these lenses form parts of the indicators for the lamps 23 and 10 respectively that acquaint the driver of the car with the condition of the headlight and of the auxiliary light or lateral signal.

Figure 7:
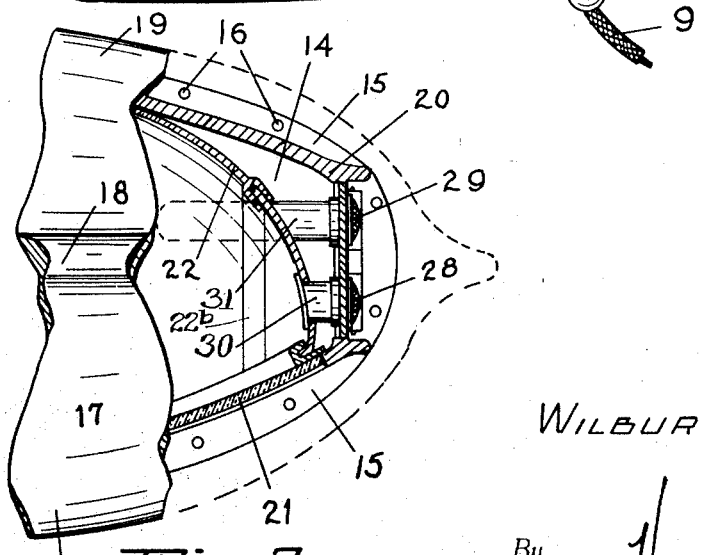
Figure 7 is a horizontal sectional view at the rear of the headlight showing details of construction.

In Figure 7, it will be seen that a light tube 30 is set in the back wall of the reflector 22, and at its rear end this light tube terminates adjacent the door 25 and especially registers with the indicator window 28 in the door. The front end of the tube is open to the interior of the reflector 22 and is in position for light rays from the auxiliary lamp 23 to pass through the tube and thence through the indicator window. Thus while the light glows in the indicator lens or disk 28 the driver of the car knows his auxiliary lamp is illuminated.

A similar light-tube 31 is provided for the headlight indicator lens 29, but this tube is longer than the tube 30, as indicated in Figure 7. The light tube, as best seen in Figure 6, is set in and rigidly attached to the rear wall of the main reflector 12, and this tube 31 passes through an opening in the base plate 14 and terminates at its rear end adjacent the door 25 at the inner side of the indicator lens 29. Thus the light rays from the main lamp 10 pass through the tube 31 causing a glow in the indicator lens 29 as long as the lamp 10 of the headlight is illuminated.

While I have illustrated the auxiliary lamp in Figures 2, 3, and 4 with a standard type of headlight casing, it will be apparent that the auxiliary lamp may be attached to other types of headlights, and the auxiliary lamp not only serves its utilitarian purposes, but enhances the appearance of the headlight in an artistic manner.

Having thus fully described my invention, what I claim as new and desire to secure by Letters Patent is:—

1. The combination with a headlight having a substantially parabolic shape, of an auxiliary signal casing mounted thereon, the top of said casing extending substantially in a horizontal plane from the top front of said headlight, substantially triangular lateral walls disposed in vertical planes oblique to and extending rearwardly on converging lines toward the longitudinal axis of the headlight, a pointed lens in the exterior lateral wall, a reflector within the casing, and a lamp within the reflector for illuminating said lens.

2. The combination with a headlight, of an auxiliary signal casing mounted thereon and provided with a rear wall, and an indicator lens in said wall, of a reflector located within the casing, a lamp within the reflector, an exterior lateral signal-lens mounted in an opening in the wall of said casing, said signal casing lens disposed in a vertical plane oblique to and extending rearwardly on a line converging toward the longitudinal axis of the headlight, and a light tube fitted in an opening in the reflector with its open rear end against said indicator lens.

3. The combination with a headlight having a main reflector and an illuminating lamp, and a light tube fitted to an opening in the wall of the reflector, of an auxiliary signal casing mounted on the headlight and provided with a rear wall, an indicator lens in said wall to receive light rays through said tube, a reflector and an interior lamp within the auxiliary casing, a lateral signal-lens mounted in said casing for illumination by said interior lamp, a light tube fitted to an opening in the second reflector, and a second indicator lens in said rear wall to receive light rays from the interior of the second reflector.

WILBUR E. SOMERS.